United States Patent
Nakamura (10) Patent No.: US 7,488,124 B2
(45) Date of Patent: Feb. 10, 2009

(54) OPTICAL TRANSMITTING AND RECEIVING MODULE HOLDER AND OPTICAL MODULE

(75) Inventor: Takayuki Nakamura, Yokohama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 11/784,713

(22) Filed: Apr. 9, 2007

(65) Prior Publication Data
US 2008/0159700 A1 Jul. 3, 2008

(30) Foreign Application Priority Data
Apr. 11, 2006 (JP) .............................. 2006-108511

(51) Int. Cl.
G02B 6/36 (2006.01)
(52) U.S. Cl. .............................. 385/93; 385/52; 385/92
(58) Field of Classification Search ................... 385/52, 385/88–94
See application file for complete search history.

(56) References Cited

U.S. PATENT DOCUMENTS 6,059,461 A * 5/2000 Aoki et al. .................... 385/60
6,302,596 B1 10/2001 Cohen et al.
6,863,452 B2 * 3/2005 Takada ......................... 385/93

FOREIGN PATENT DOCUMENTS

| JP | 2004-239997 | 8/2004 |
|---|---|---|
| JP | 2004-294636 | 10/2004 |
| JP | 2004-354452 | 12/2004 |

* cited by examiner

*Primary Examiner*—Sung H Pak
*Assistant Examiner*—Daniel Petkovsek
(74) *Attorney, Agent, or Firm*—William L. Androlia; H. Henry Koda (57) ABSTRACT

An optical transmitting and receiving module holder that can quickly, easily, and accurately adjust the relative positions of an optical transmitting module holder section and an optical receiving module holder section is provided. An optical transmitting and receiving module holder includes a first optical module holder section and a second optical module holder section. A lens is integrally formed between an optical fiber attaching section and a photoelectric conversion element housing section in the first optical module holder section. A lens is integrally formed between an optical fiber attaching section and a photoelectric conversion element housing section in the second optical module holder section. Any of a plurality of protruding sections formed on side surfaces of the photoelectric conversion element housing section of the second optical module holder section is engaged with a groove section formed on a side surface of the photoelectric conversion element housing section of the first optical module holder section. Relative positions of the first optical module holder section and the second optical module holder section are adjusted.

7 Claims, 8 Drawing Sheets

OPTICAL TRANSMITTING AND RECEIVING MODULE HOLDER AND OPTICAL MODULE

BACKGROUND OF THE INVENTION

1. Field of the Invention

The present invention relates to an optical transmitting and receiving module holder and an optical module. In particular, the present invention relates to an optical transmitting and receiving module holder and an optical module thereof, in which the optical transmitting and receiving module holder uses an optical transmitting module holder section and an optical receiving module holder section in combination for optical fiber communication.

2. Description of the Related Art

In recent years, with the increasing speed and the increasing capacity of data communication, the demand for an optical fiber communication technology using optical fiber as an optical transmission line is rising. In such optical fiber communication, a transmitting end converts a signal to be transmitted to an electrical signal. Based on the electrical signal, the transmitting end transmits an optical signal formed from light emitted from a communication light source to a receiving end using an optical fiber. A light detector receives the transmitted optical signal. The optical signal is reverted to the electrical signal, and the electrical signal is converted to a required signal. In this way, an optical module is used to convert the optical signal led in by the optical fiber to the electrical signal, or to convert the electrical signal to the optical signal and lead out the optical signal to the optical fiber. The optical module used in optical fiber communication such as this includes a photoelectric conversion element package (for example, a package housing a semiconductor light emitting element or a semiconductor light receiving element), a ferrule, a lens, and a holder. The ferrule holds an end face of the optical fiber. The lens optically couples the photoelectric conversion element within the photoelectric conversion element package with the optical fiber held by the ferrule and enables optical communication. The holder houses the photoelectric conversion element package, the ferrule, and the lens.

As an optical module such as this, for example, various optical modules having the following configuration are known. An engaging section is formed on one end of a sleeve. A ferrule used to position an optical fiber is engaged with the engaging section. An element housing section is formed on the other end of the sleeve on a same axis as the engaging section. A lens holding section is formed between the engaging section and the element housing section. The element housing section houses the semiconductor light emitting element or light receiving element. The lens holding section holds a light-collecting lens. However, in these optical modules, the semiconductor light emitting element or the semiconductor light receiving element, the ferrule, and the lens are respectively individual components. Therefore, when these components are attached to the holder, a centering operation is required to be performed so that the optical axis of each component matches. The centering operation is difficult. As a result, there is a problem in that operation efficiency is poor.

To solve this problem, the present applicant has proposed optical modules in which a lens and a holder are integrally formed (for example, refer to Patent Literatures 1 to 3). In these optical modules, the position alignment of the optical axis of the lens and the axis line of the holder becomes unnecessary. Therefore, the assembly operation of the optical module is facilitated, and the manufacturing efficiency of the optical module can be enhanced.

Figure 10:
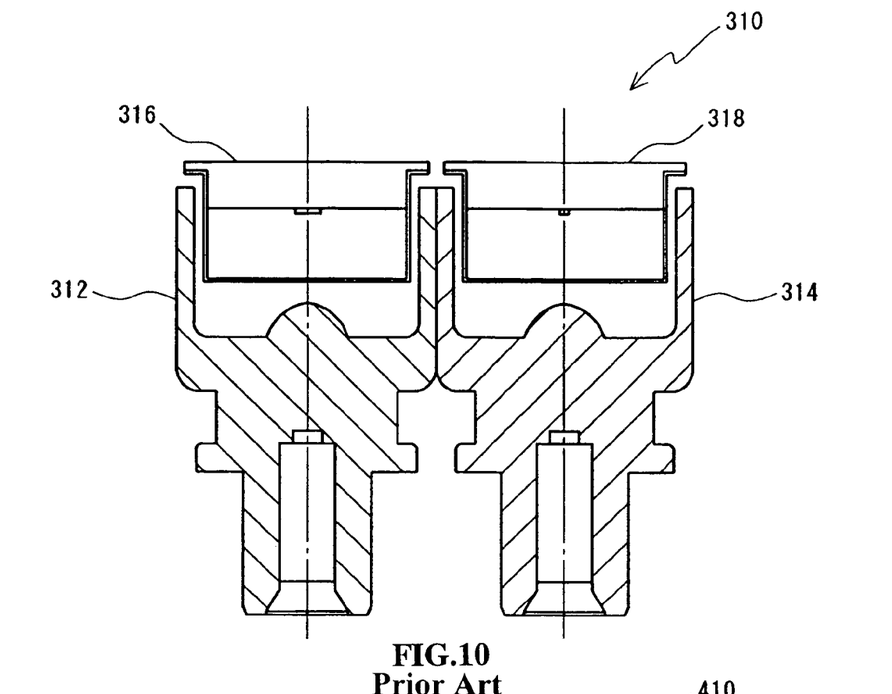
FIG. 10 is a cross-sectional view of a conventional CAN package-type optical transmitting and receiving module holder.

A holder for an optical module such as this in which the lens is integrally formed can be used as an optical transmitting module holder section and an optical receiving module holder section of an optical light transmitting and receiving module of an optical transceiver. FIG. 10 is a typical example of an optical transmitting and receiving module such as this. As shown in FIG. 10, in an optical transmitting and receiving module 310, an optical module holder section 312 and an optical module holder section 314 respectively house a CAN-type package 316 and a CAN-type package 318. The CAN-type package 316 houses a laser diode (LD) as a light emitting element. The CAN-type package 318 houses a photo diode (PD) as a light receiving element.

Figure 11:
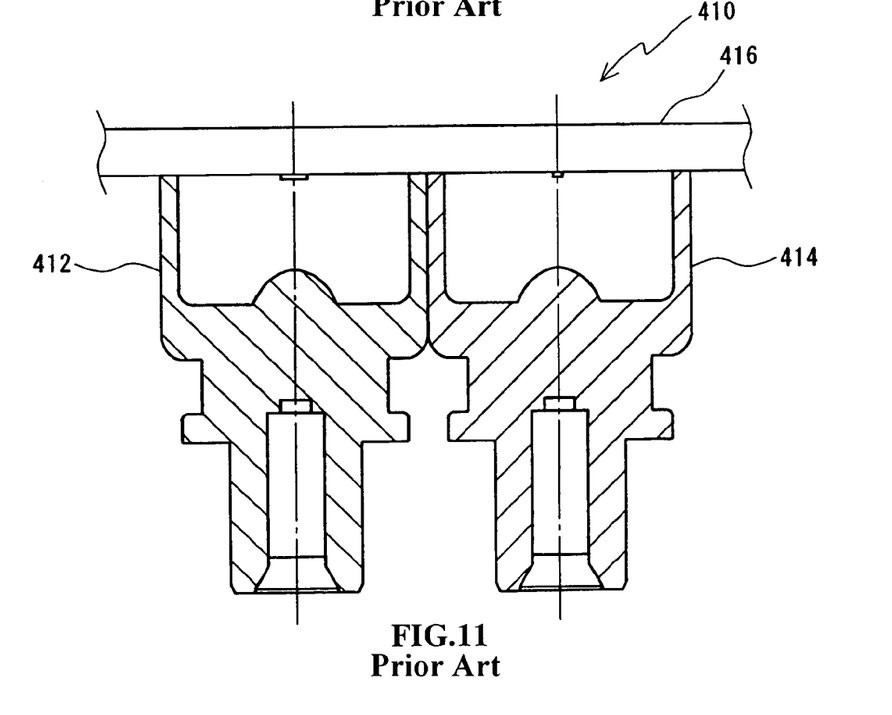
FIG. 11 is a cross-sectional view of a conventional board-mounted-type optical transmitting and receiving module holder.
Figure 12A:
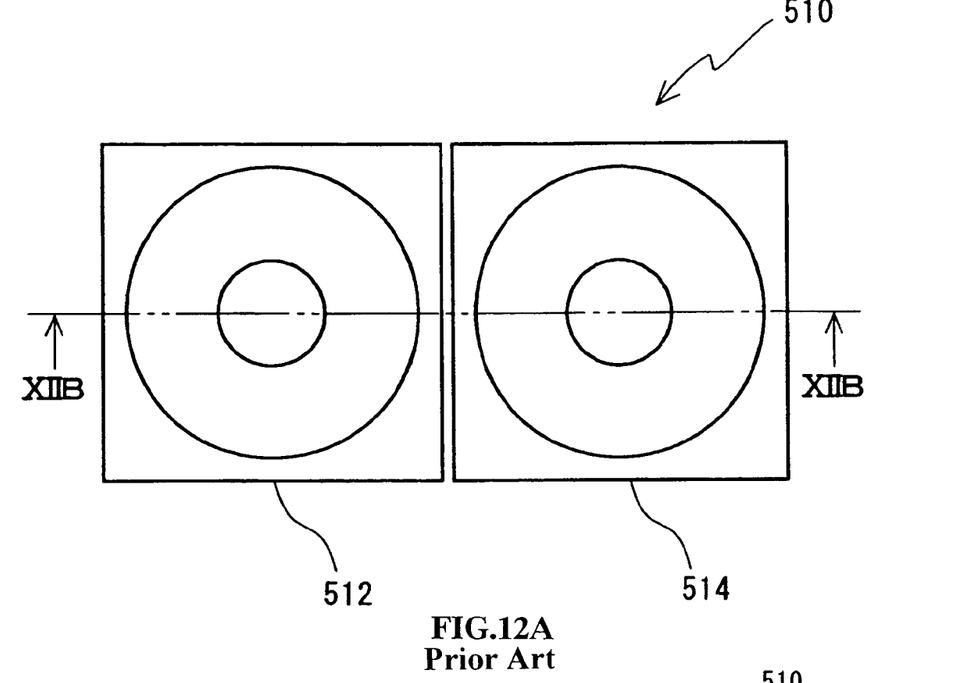
FIG. 12A is a planar view explaining a mounting of the conventional board-mounted-type optical transmitting and receiving module holder.
Figure 12B:
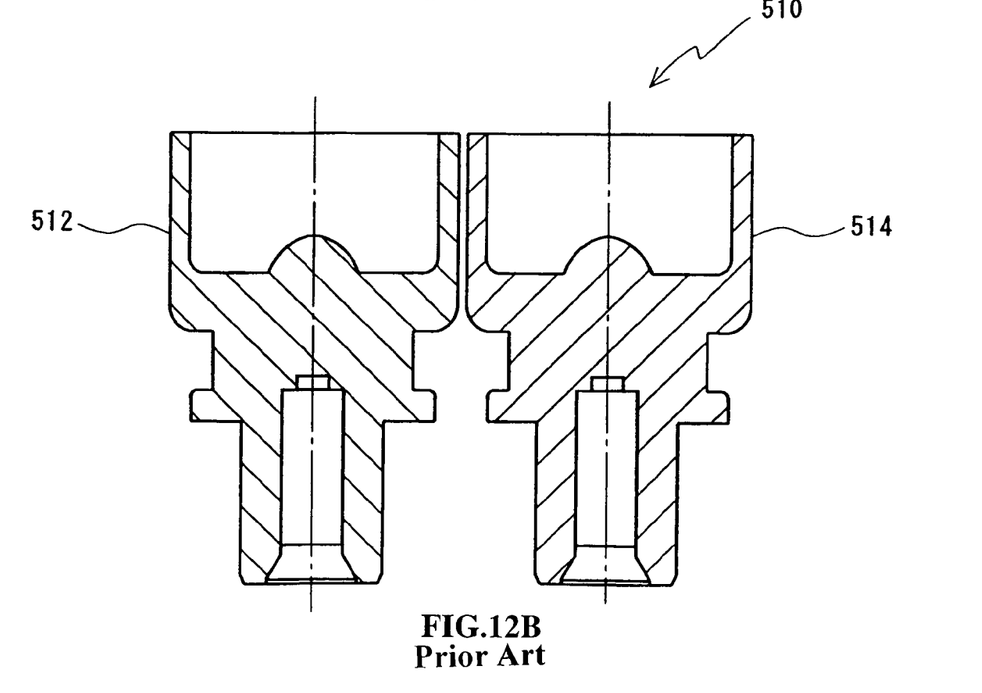
FIG. 12B is a cross-sectional view of the optical transmitting and receiving module holder in FIG. 12A, taken along the line XIIB-XIIB.

Further popularization of fiber-to-the-home (FTTH), home networks, in-vehicle LAN, and the like is expected in the future. A reduction in the cost of the optical transceivers used in FTTH, home networks, in-vehicle LAN, and the like is imperative. Therefore, in place of the CAN-type package, a board-mounted-type package having low manufacturing cost is becoming popular. FIG. 11 is an example of an optical transmitting and receiving module using a board-mounted-type package such as this. As shown in FIG. 11, in an optical transmitting and receiving module 410, an optical module holder 412 and an optical module holder 414 are mounted on a board 416, on which a light emitting element and a light receiving element are mounted. In the optical transmitting and receiving module 410 using the board-mounted-type package, an alignment of the optical components in a Z direction (direction of the optical axis of the lens) is not required. Therefore, cost reduction due to a shortening of manufacturing time can be achieved. In addition, generally, as shown in FIG. 12A and FIG. 12B, a slight gap is provided between an optical transmitting module holder section 512 and an optical receiving module holder section 514 of an optical transmitting and receiving module holder 510. Respective alignments of the optical transmitting module and the optical receiving module are performed during the assembly between optical components. However, simultaneous alignment in a state in which the optical transmitting module holder section and the optical receiving module holder section are engaged is also proposed (for example, refer to Patent Literature 4).

Patent Literature 1: Japanese Patent Laid-open Publication No. 2004-239997 (Paragraph No. 0008)

Patent Literature 2: Japanese Patent Laid-open Publication No. 2004-294636 (Paragraph No. 0013)

Patent Literature 3: Japanese Patent Laid-open Publication No. 2004-354452 (Paragraph No. 0013 to 0030)

Patent Literature 4: U.S. Pat. No. 6,302,596 Specifications (Column 7, Line 40 to 52)

SUMMARY OF THE INVENTION

However, in the optical transmitting and receiving module holder proposed in Patent Literature 4, the relative positions of the optical transmitting module holder section and the optical receiving module holder section cannot be adjusted. Therefore, due to variations in the positional accuracy of each manufacturing lot of the optical transmitting module holder section and the optical receiving module holder section, even when an alignment between the optical components of one optical module (for example, the optical transmitting module) is performed, the alignment between the optical components of the other optical module (for example, the optical receiving module) may be insufficient. Such variations are also the same when the optical transmitting module holder section and the optical receiving module holder section are integrally formed. In some instances, the variation in the positional accuracy of each manufacturing lot is almost 20 μm.

Therefore, an object of the present invention is to provide an optical transmitting and receiving module holder that can quickly, easily, and accurately adjust the relative positions of an optical transmitting module holder section and an optical receiving module holder section.

In order to solve the above-described problems, the optical transmitting and receiving module holder of the present invention includes a first optical module holder section and a second optical module holder section. An optical transmission line attaching section for attaching an end section of an optical transmission line is formed on one end of the first optical module holder section. A photoelectric element housing section for housing a photoelectric element including one of either a light emitting element or a light receiving element is formed on the other end of the first optical module holder section. An optical transmission line attaching section for attaching an end of an optical transmission line is formed on one end of the second optical module holder section. A photoelectric element housing section for housing a photoelectric element including the other of either the light emitting element or the light receiving element is formed on the other end of the second optical module holder section. At least one engaging section is provided on one of either the first optical module holder section or the second optical module holder section. A plurality of engaging-subject sections that can be engaged with the engaging section are provided on the other of either the first optical module holder section or the second optical module holder section. One engaging section engages with any of the plural engaging-subject sections, and the relative positions of the first optical module holder section and the second optical module holder section are adjusted.

In the optical transmitting and receiving module holder, the outer shape of the respective photoelectric element housing sections in the first optical module holder section and the second optical module holder section is preferably a rough polygonal column, having a plurality of side surfaces extending in the axis line direction thereof. The engaging section is preferably formed on at least one side surface of a plurality of side surfaces of one of either the first optical module holder section or the second optical module holder section. Respective plural engaging-subject sections are preferably formed on each side surface of the plurality of side surfaces of the other of either the first optical module holder section of the second optical module holder section.

In addition, in the optical transmitting and receiving module holder described above, the engaging section is one of either a protruding section or a groove section. The plural engaging subject sections are respectively the other of either the protruding section or the groove section. The protruding section can preferably be engaged with the groove section. When each of the plural engaging-subject sections is the protruding section, the width and height of each protruding section preferably respectively correspond with the width and depth of the groove section that is the engaging section. At least one of either the width or the height of each protruding section preferably differs from at least one of either the width or the height of the other protruding sections. When each of the plural engaging-subject sections is the groove section, the width and depth of each groove section preferably respectively correspond with the width and height of the protruding section that is the engaging section. At least one of either the width or the depth of each groove section preferably differs from at least one of either the width or the depth of other protruding sections.

Furthermore, in the above-described optical transmitting and receiving module holder, a lens can be integrally formed between the optical transmission line attaching section and the photoelectric element housing section of the first optical module holder section. A lens can be integrally formed between the optical transmission line attaching section and the photoelectric element housing section of the second optical module holder section. In this case, the axis lines of the first optical module holder section and the second optical module holder section are preferably disposed in parallel with each other and in parallel with the optical axis of each lens. One of the engaging sections preferably engages with any of the plural engaging-subject sections, and the relative positions of the first optical module holder section and the second optical module holder section in a direction perpendicular to the axis line are adjusted.

In addition, the optical module of the present invention includes the optical transmitting and receiving module holder described above and photoelectric elements mounted onto each of the first optical module holder section and the second optical module holder section in the optical transmitting and receiving module holder.

EFFECT OF THE INVENTION

According to the present invention, an optical transmitting and receiving module holder that can quickly, easily, and accurately adjust the relative positions of an optical transmitting module holder section and an optical receiving module holder section can be provided.

DETAILED DESCRIPTION OF THE PREFERRED EMBODIMENT

An optical transmitting and receiving module holder according to the embodiments of the present invention will be described in detail here below with reference to accompanying drawings.

First Embodiment

Figure 1A:
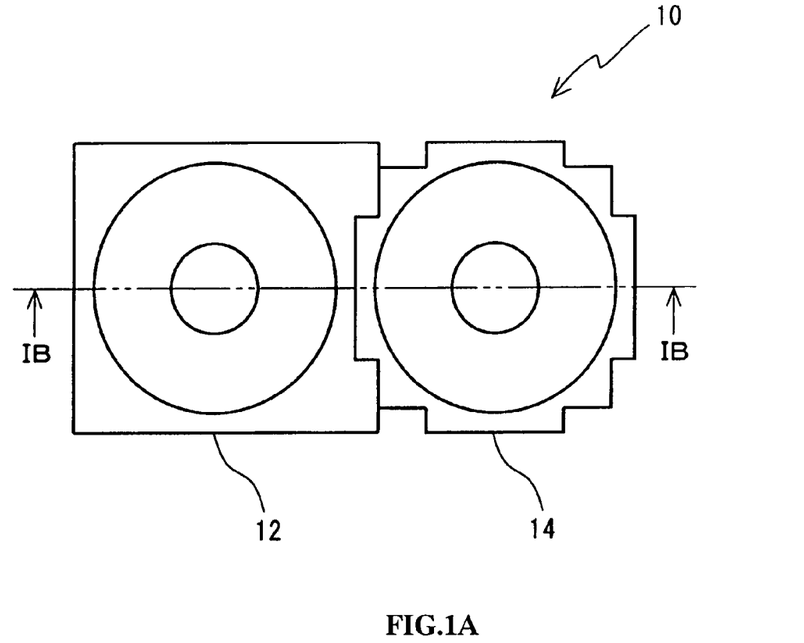
FIG. 1A is a planar view of an optical transmitting and receiving module holder according to a first embodiment of the present invention.
Figure 1B:
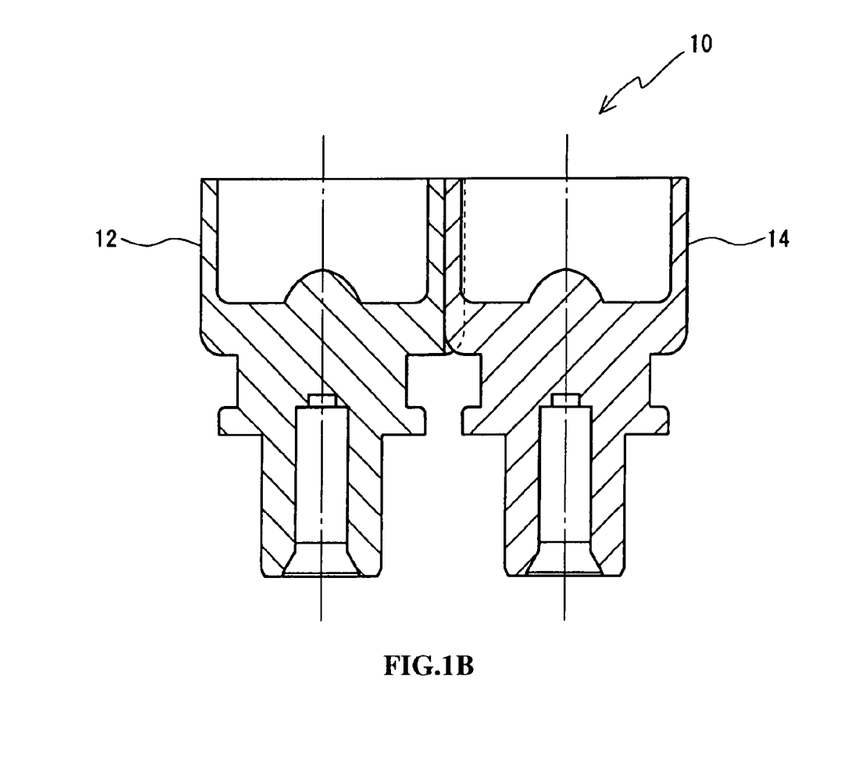
FIG. 1B is a cross-sectional view of the optical transmitting and receiving module holder in FIG. 1A, taken along line IB-IB.

FIG. 1A to FIG. 4 show the optical transmitting and receiving module holder according to a first embodiment of the present invention. As shown in FIG. 1A and FIG. 1B, an optical transmitting and receiving module holder according to the present embodiment includes a first optical module holder section 12 and a second optical module holder section 14. The first optical module holder section 12 is used as one of either an optical transmitting module holder or an optical receiving module holder. The second optical module holder section 14 is used as the other of either the optical transmitting module holder or the optical receiving module holder. The first optical module holder section 12 and the second optical module holder section 14 are configured to engage and interlock with each other. The first optical module holder section 12 and the second optical module holder section 14 are respectively integrally formed through injection-molding of a permeable resin material, such as polyether imide (PEI), polycarbonate (PC), polymethyl methacrylate (PMMA), silicon resin, polyolefin, or the like.

Figure 2A:
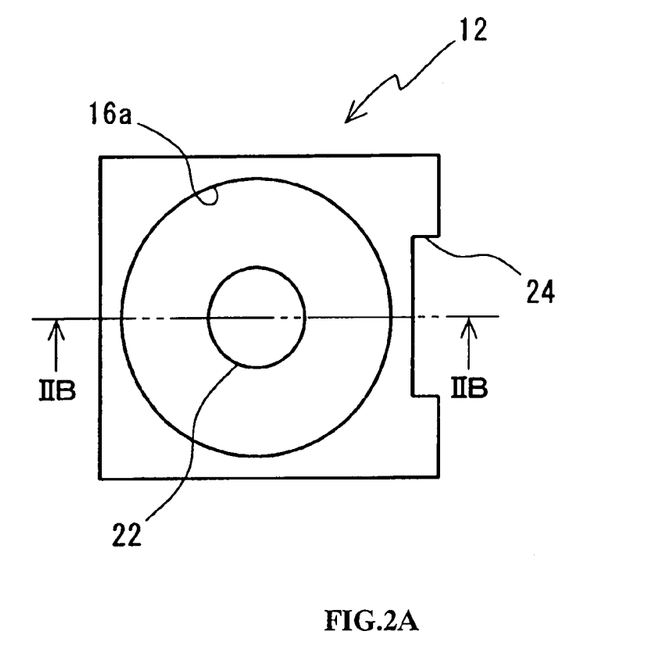
FIG. 2A is a planar view of a first optical module holder section of the optical transmitting and receiving module holder in FIG. 1A.
Figure 2B:
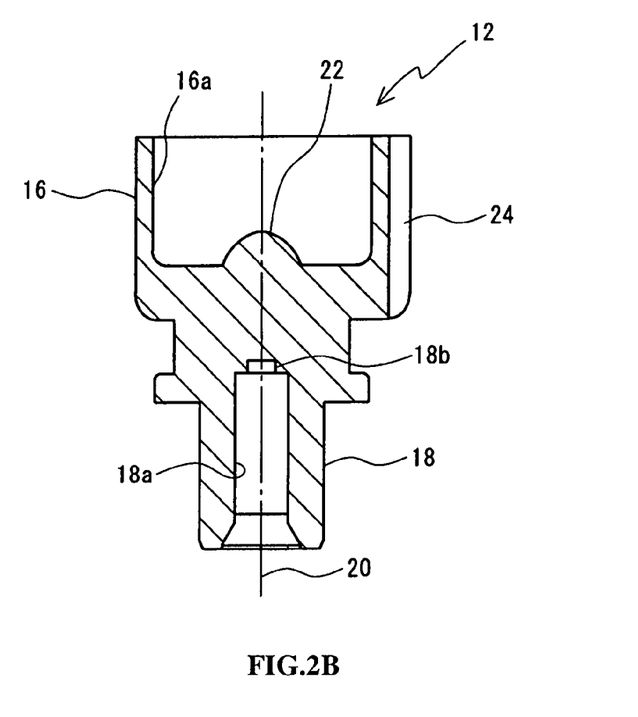
FIG. 2B is a cross-sectional view of the first optical module holder section in FIG. 2A, taken along line IIB-IIB.

As shown in FIG. 2A and FIG. 2B, the first optical module holder section 12 includes a photoelectric conversion element housing section 16 having a roughly rectangular outer shape and a roughly cylindrical optical fiber attaching section 18. The photoelectric conversion element housing section 16 is used to house a photoelectric conversion element. The optical fiber attaching section 18 is integrally formed with the photoelectric conversion element housing section 16 and is used to attach an optical fiber. A roughly columnar photoelectric conversion element housing recess section 16a is formed on a surface of the photoelectric conversion element housing section 16 that is opposite to the optical fiber attaching section 18 (a surface on one end of the first optical module holder section 12). A roughly columnar optical fiber attaching recess section 18a is formed on a surface of the optical fiber attaching element 18 that is opposite to the photoelectric conversion element housing section 16 (a surface on the other end of the first optical module holder section 12). The optical fiber attaching recess section 18a has a smaller diameter than the photoelectric conversion element housing recess section 16a. The photoelectric conversion element housing recess section 16a and the optical fiber attaching recess section 18a are respectively disposed in the periphery of an axis line 20 (see FIG. 2B) (so that the axis line 20 is a center line) and extends in a direction along the axis line 20.

Therefore, a circular opening section is formed on an end surface of the photoelectric conversion element housing section 16 (a surface on one end of the first optical module holder section 12 in a direction along the axis line 20). The photoelectric conversion element (not shown) (for example, a semiconductor light emitting element when the first optical module holder section 12 is used as an optical transmitting module holder) is housed within the photoelectric conversion element housing recess section 16a.

At the same time, a circular opening section is formed on an end surface of the optical fiber attaching section 18 (a surface on the other end of the first optical module holder section 12 along the axis line 20). A ferrule (not shown) holding an end section of the optical fiber is removably engaged and held within the optical fiber attaching recess section 18a. In addition, a columnar recess section 18b is formed in a center section on a bottom surface of the optical fiber attaching recess section 18a (a surface on a lens 22 side). The recess section 18b has a smaller diameter than the optical fiber attaching recess 18a. The recess section 18b is used to prevent the end section of the optical fiber held by the ferrule from coming into contact with the first optical module holder section 12 and becoming damaged. The shape of the bottom surface of the recess section 18b (the surface on the lens 22 side) is not necessarily required to be planar. As long as optical coupling between the optical fiber and the photoelectric conversion element can be appropriately performed, the bottom surface can have a concave shape or a convex shape.

The lens 22 (for example, an aspheric lens) is integrally formed in the center section on the bottom surface of the photoelectric conversion element housing recess section 16a of the photoelectric conversion element housing section 16. The lens 22 protrudes toward the photoelectric conversion element side (not shown). The photoelectric conversion element is stored within the photoelectric conversion element housing section 16. The lens 22 is formed so that the optical axis thereof is aligned with the axis line 20 of the first optical module holder section 12 (particularly the axis line of the optical fiber attaching recess 18a).

In addition, a groove section (concave section) 24 is formed in the roughly center section of one side surface of the photoelectric conversion element storing section 16 (a surface on the second optical module holder section 14 side). The groove section 24 has a roughly rectangular cross-section and extends in the direction along the axis line 20. As described hereafter, the groove section 24 is formed so as to engage with any of four protruding sections 34a, 34b, 34c, and 34d formed on a photoelectric conversion element housing section 26 of the second optical module holder section 14.

The second optical module holder section 14 has almost the same shape as the first optical module holder section 12, aside from the outer shape of the photoelectric conversion element housing section 26 (particularly the shape of the side surface) differing from the outer shape (particularly the shape of the side surface) of the photoelectric conversion element housing section 16 of the first optical module holder section 12.

Figure 3A:
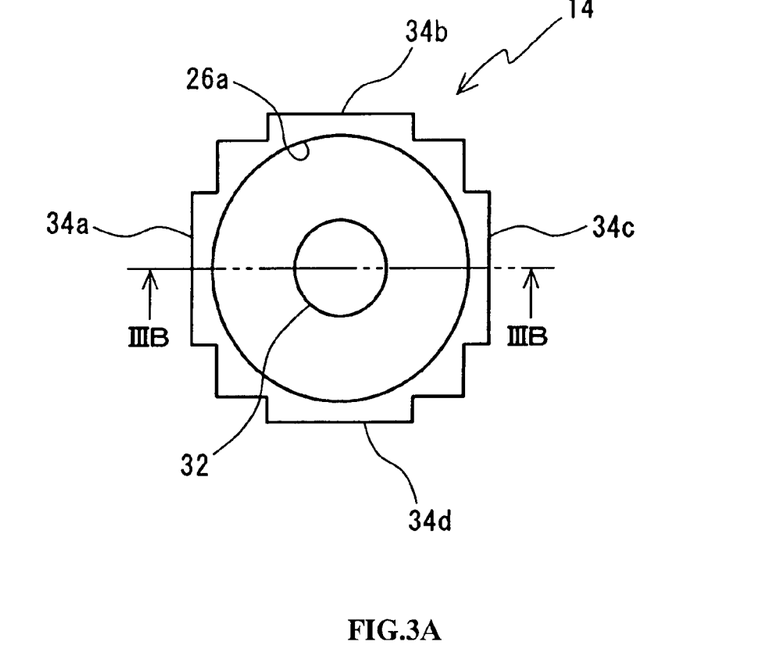
FIG. 3A is a planar view of a second optical module holder section of the optical transmitting and receiving module holder in FIG. 1A.
Figure 3B:
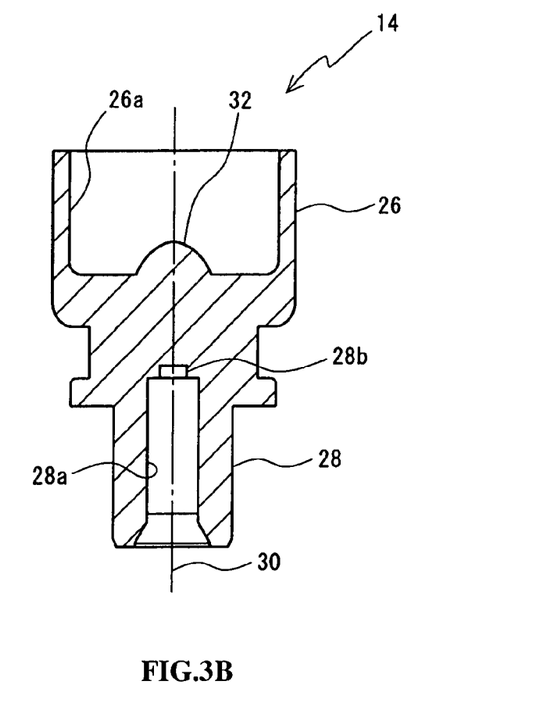
FIG. 3B is a cross-sectional view of the second optical module holder section in FIG. 3A, taken along line IIIB-IIIB.

In other words, as shown in FIG. 3A and FIG. 3B, the second optical module holder section 14 includes the photoelectric conversion element housing section 26 having a roughly rectangular outer shape and a roughly cylindrical optical fiber attaching section 28. The photoelectric conversion element housing section 26 is used to house a photoelectric conversion element. The optical fiber attaching section 28 is integrally formed with the photoelectric conversion element housing section 26 and is used to attach an optical fiber. A roughly columnar photoelectric conversion element housing recess section 26a is formed on a surface of the photoelectric conversion element housing section 26 that is opposite to the optical fiber attaching section 28 (a surface on one end of the second optical module holder section 14). A roughly columnar optical fiber attaching recess section 28a is formed on a surface of the optical fiber attaching element 28 that is opposite to the photoelectric conversion element housing section 26 (a surface on the other end of the second optical module holder section 14). The optical fiber attaching recess section 28a has a smaller diameter than the photoelectric conversion element housing recess section 26a. The photoelectric conversion element housing recess section 26a and the optical fiber attaching recess section 28a are respectively disposed in the periphery of axis line 30 (see FIG. 3B) (so that the axis line 30 is a center line) and extends in a direction along the axis line 30.

Therefore, a circular opening section is formed on an end surface of the photoelectric conversion element housing section 26 (a surface on one end of the second optical module holder section 14 in a direction along the axis line 30). The photoelectric conversion element (not shown) (for example, a semiconductor light receiving element when the second optical module holder section 14 is used as an optical receiving module holder) is housed within the photoelectric conversion element housing recess section 26a.

At the same time, a circular opening section is formed on an end surface of the optical fiber attaching section 28 (a surface on the other end of the second optical module holder section 14 along the axis line 30). A ferrule (not shown) holding an end section of the optical fiber is removably engaged and held within the optical fiber attaching recess section 28a. In addition, a columnar recess section 28b is formed in a center section on a bottom surface of the optical fiber attaching recess section 28a (a surface on a lens 32 side). The recess section 28b has a smaller diameter than the optical fiber attaching recess section 28a. The recess section 28b is used to prevent the end section of the optical fiber held by the ferrule from coming into contact with the second optical module holder section 14 and becoming damaged. The shape of the bottom surface of the recess section 28b (the surface on the lens 32 side) is not necessarily required to be planar. As long as optical coupling between the optical fiber and the photoelectric conversion element can be appropriately performed, the bottom surface can have a concave shape or a convex shape.

The lens 32 (for example, an aspheric lens) is integrally formed in the center section on the bottom surface of the photoelectric conversion element housing recess section 26a of the photoelectric conversion element housing section 26. The lens 32 protrudes toward the photoelectric conversion element side (not shown). The photoelectric conversion element is stored within the photoelectric conversion element housing section 26. The lens 32 is formed so that the optical axis thereof is aligned with the axis line 30 of the second optical module holder section 14 (particularly the axis line of the optical fiber attaching recess 28a).

Figure 4:
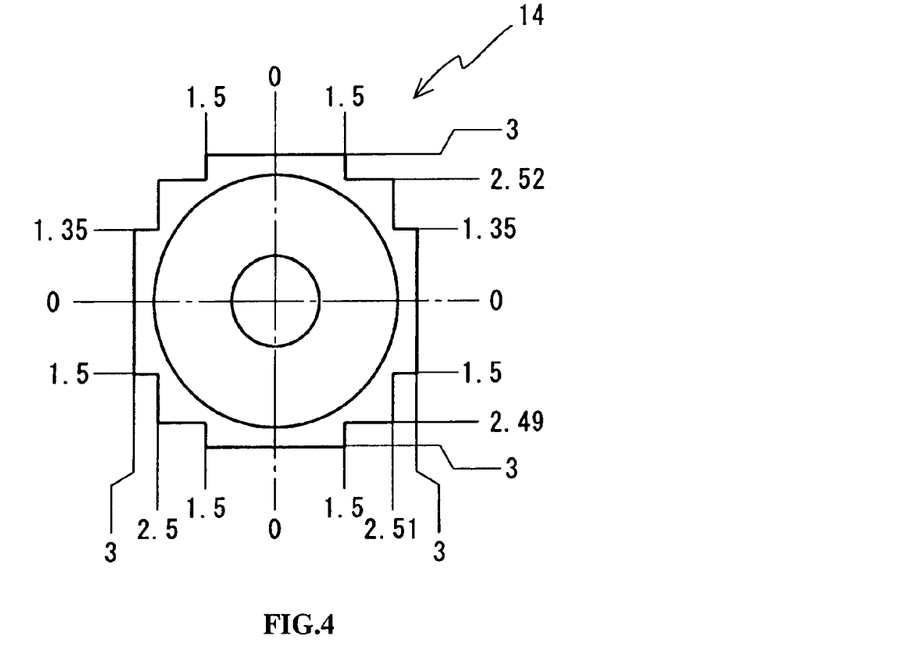
FIG. 4 is a planar view of an example of a size of a protruding section in the second optical module holder section of the optical transmitting and receiving module holder in FIG. 1A.
Figure 9:
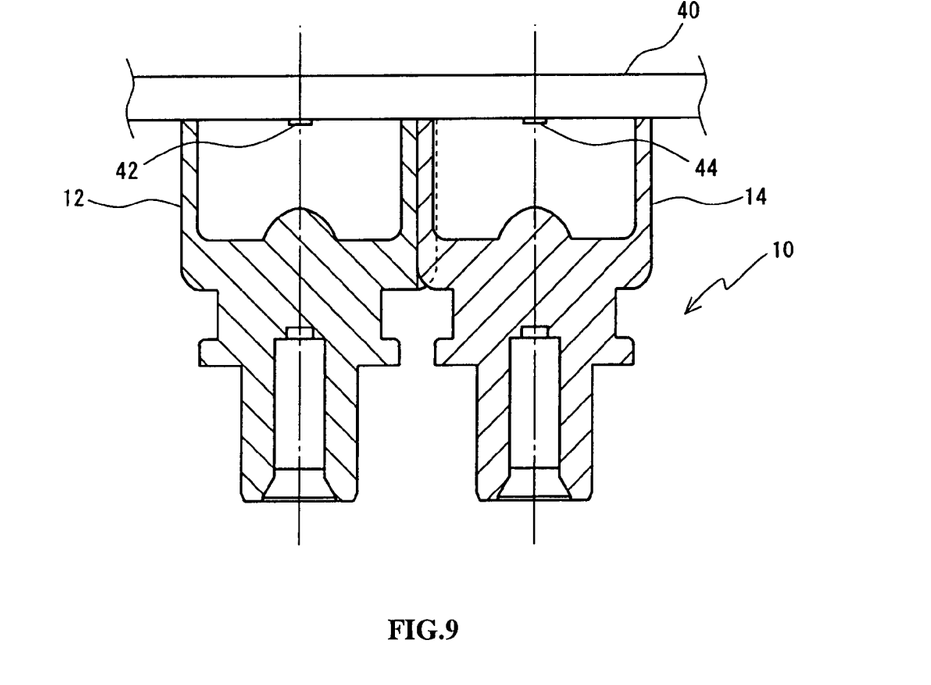
FIG. 9 is a cross-sectional view of an optical transmitting and receiving module using the optical transmitting and receiving module holder in FIG. 1A, according to an embodiment.

In addition, the protruding sections 34a, 34b, 34c, and 34d are formed in a roughly center section on each of the four side surfaces of the photoelectric conversion element housing section 26. The protruding sections 34a, 34b, 34c, and 34d have a roughly rectangular cross-section and extend in a direction along the axis line 30. The protruding sections 34a, 34b, 34c, and 34d are, for example, formed so that the respective widths and heights slightly differ, as shown in FIG. 4. The numeric values shown in FIG. 4 indicate the distances (mm) in an X direction (left to right direction in the diagram) and a Y direction (top to bottom direction in the diagram) from the optical axis of the lens 32 in the second optical module holder section 14. Because the widths and heights of the protruding sections 34a, 34b, 34c, and 34d in the second optical module holder section 14 are formed so as to slightly differ in this way, the protrusion section (any of 34a, 34b, 34c, and 34d) to be engaged with the groove section 24 of the first optical module holder section 12 is appropriately selected and is optimally disposed so that the optical coupling is most favorable. As a result, upon adjustment of the optical axis of the lens 22 in the first optical module holder section 12, the optical axis of the lens 32 in the second optical module holder section 14, and the misalignment of the respective photoelectric conversion elements (misalignments in the X direction and the Y direction), the optical transmitting and receiving module holder 10 can be fixed onto a board 40 on which a photoelectric conversion element 42 and a photoelectric conversion element 44 are mounted, as shown in FIG. 9, and the optical transmitting receiving module can be produced.

As a result of such adjustments, a space (distance between pitches on a ferrule insertion side) between the axis line of the optical fiber attaching section 18 of the first optical module holder section 12 and the axis line of the optical fiber attaching section 28 of the second optical module holder section 14 also changes. However, compared to the variations in the positional accuracy of each manufacturing lot of the optical elements, the allowable range of deviation in the distance between pitches on the ferrule insertion side is wide. Therefore, this is not considered to be particularly problematic.

Second Embodiment

Figure 5:
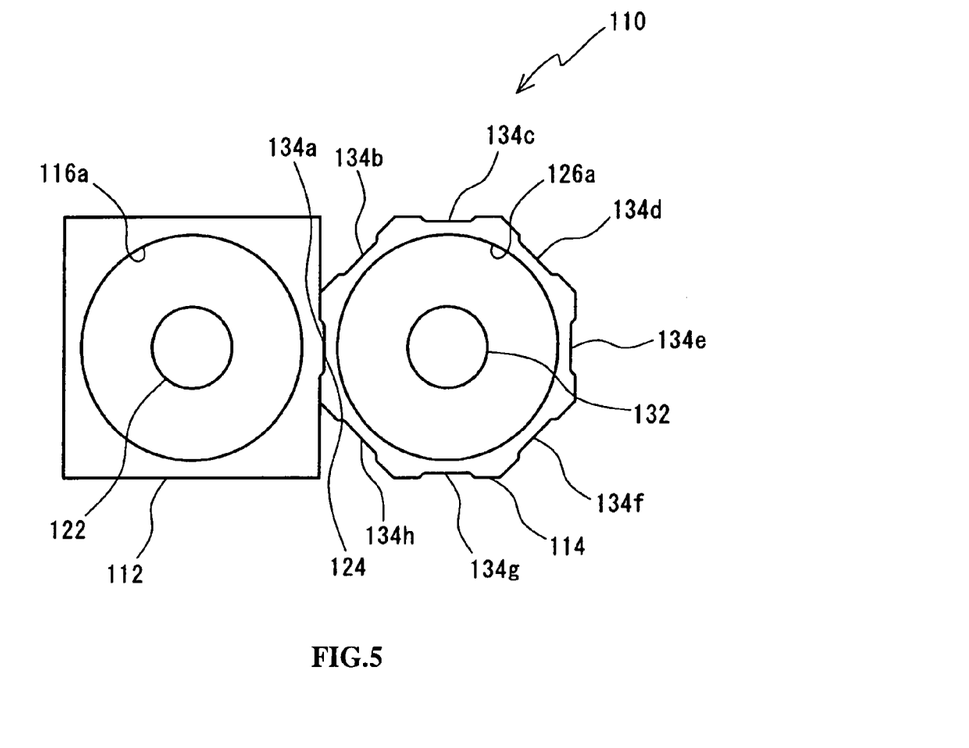
FIG. 5 is a planar view of an optical transmitting and receiving module holder according to a second embodiment of the present invention.
Figure 6:
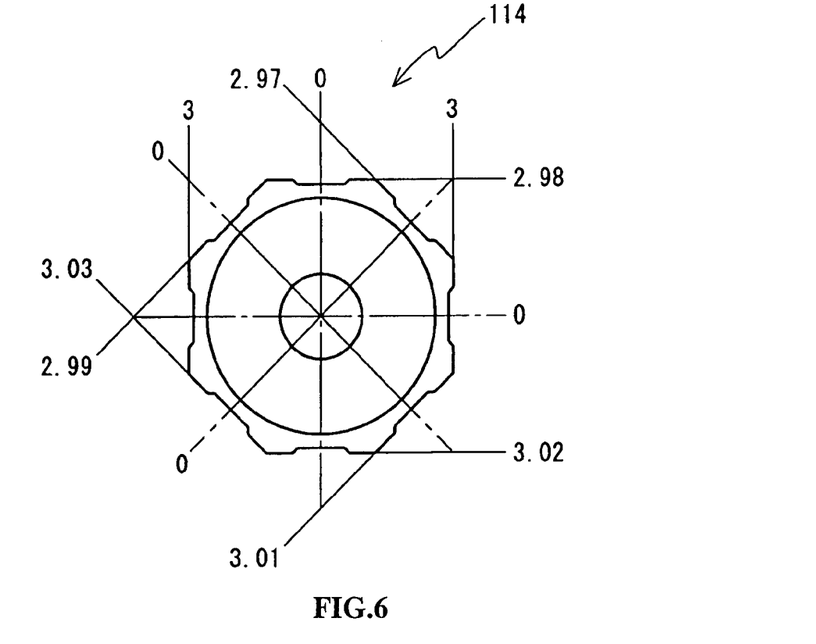
FIG. 6 is a planar view of an example of a size of a protruding section in the second optical module holder section of the optical transmitting and receiving module holder in FIG. 5.

FIG. 5 and FIG. 6 show an optical transmitting and receiving module holder according to a second embodiment of the present invention. An optical transmitting and receiving module holder 110 according to the present embodiment is almost the same as the optical transmitting and receiving module holder 10 according to the first embodiment, aside from the followings. Therefore, explanations of that are the same are omitted. A protruding section 124 is formed in a roughly center section on one side surface (a surface on a second optical module holder section 114 side) of a photoelectric conversion element housing section of a first optical module holder section 112. The protruding section 124 has a roughly trapezoidal cross-section and extends along the axis line of the photoelectric conversion element housing section. The second optical module holder section 114 has a roughly octagonal-column outer shape. Groove sections (concave sections) 134a, 134b, 134c, 134d, 134e, 134f, 134g, and 134h are formed in the roughly center section on each of the eight side surfaces of the second optical module holder section 114. The groove sections 134a, 134b, 134c, 134d, 134e, 134f, 134g, and 134h have a roughly trapezoidal cross-section and extend along the axis line of the second optical module holder section 114. In FIG. 5, the reference numerals 116a and 126a refer to the photoelectric conversion element housing recess section. The reference numerals 122 and 132 refer to the lens.

The groove sections (concave sections) 134a, 134b, 134c, 134d, 134e, 134f, 134g, and 134h formed in the roughly center sections on each of the eight side surfaces of the second optical module holder section 114 are formed so that the respective widths and depths slightly differ, for example, as shown in FIG. 6. The numeric values shown in FIG. 6 indicate the distances (mm) in the X direction (left to right direction in the diagram), the Y direction (top to bottom direction in the diagram), and an intermediate direction between the X direction and the Y direction from the optical axis of the lens 132 in the second optical module holder section 114. Because the widths and heights of the groove sections (concave sections) 134a, 134b, 134c, 134d, 134e, 134f, 134g, and 134h of the second optical module holder section 114 slightly differ in this way, the groove section (any of 134a, 134b, 134c, 134d, 134e, 134f, 134g, and 134h) to be engaged with the protrusion section 124 of the first optical module holder section 112 is appropriately selected and is optimally disposed so that the optical coupling is most favorable. As a result, upon adjustment of the optical axis of the lens 122 of the first optical module holder section 112, the optical axis of the lens 132 of the second optical module holder section 114, and the misalignment of the respective photoelectric conversion elements (misalignments in the X direction and the Y direction), the optical transmitting and receiving module holder 110 can be fixed onto a board on which the photoelectric conversion elements are mounted, and the optical transmitting and receiving module can be produced as with the optical transmitting and receiving module shown in FIG. 9. In particular, in the optical transmitting and receiving module holder 110 according to the present embodiment, the groove section to be engaged with the protruding section 124 in the first optical module holder section 112 can be appropriately selected from the eight groove sections. Therefore, compared to the optical transmitting and receiving module holder 10 according to the first embodiment, fine adjustments can be made.

Third Embodiment

Figure 7:
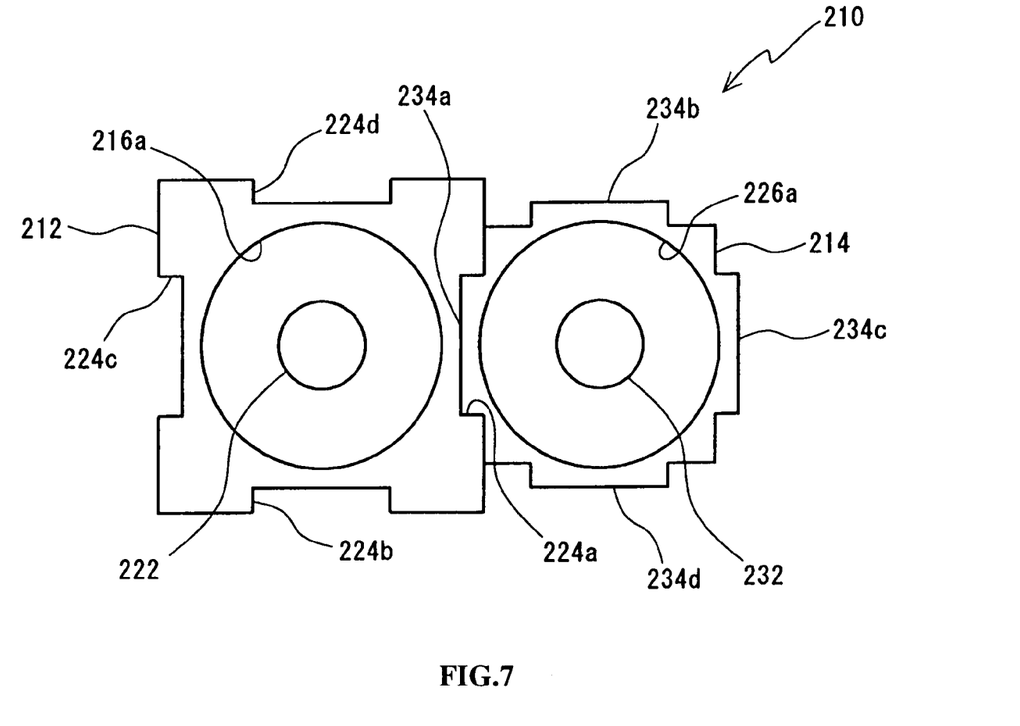
FIG. 7 is a planar view of an optical transmitting and receiving module holder according to a third embodiment of the present invention.
Figure 8:
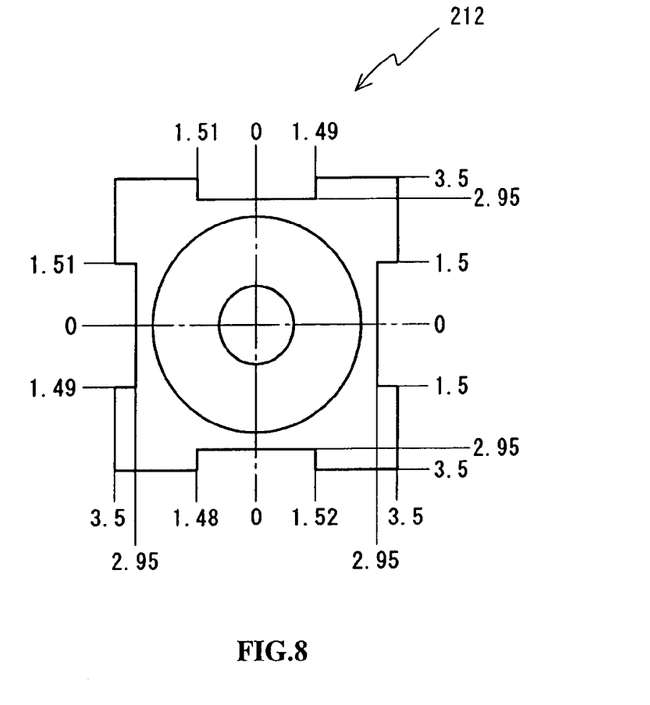
FIG. 8 is a planar view of an example of a size of a protruding section in the first optical module holder section of the optical transmitting and receiving module holder in FIG. 7.

FIG. 7 and FIG. 8 show an optical transmitting and receiving module holder according to a third embodiment of the present invention. An optical transmitting and receiving module holder 210 according to the present embodiment is almost the same as the optical transmitting and receiving module holder 10 according to the first embodiment, aside from the following. Therefore, explanations of sections that are the same are omitted. Groove sections (concave sections) 224a, 224b, 224c, and 224d are formed in a roughly center section on each of the four side surfaces of the photoelectric conversion element housing section of a first optical module holder section 212. The groove sections (concave sections) 224a, 224b, 224c, and 224d have a roughly rectangular cross-section and extend in a direction along the axis line of the first optical module holder section 212. In FIG. 7, the reference numerals 216a and 226a refer to the photoelectric conversion element housing recess section. The reference numerals 222 and 232 refer to the lens. The reference numerals 234a, 234b, 234c, and 234d refer to the protruding section of a second optical module holder section 214.

The groove sections (concave sections) 224a, 224b, 224c, and 224d formed in the roughly center section on each of the four side surfaces of the first optical module holder section 212 are, for example, formed so that the respective widths and depths slightly differ, as shown in FIG. 8. The numeric values shown in FIG. 8 indicate the distances (mm) in the X direction (left to right direction in the diagram) and the Y direction (top to bottom direction in the diagram) from the optical axis of the lens 222 in the first optical module holder section 212. In addition, as in the second optical module holder section 14 of the optical transmitting and receiving module holder 10 according to the first embodiment, the protruding sections 234a, 234b, 234c, and 234d formed in a roughly center section on each of the four side surfaces of the second optical module holder section 214 are formed so that respective widths and heights slightly differ, for example, as shown in FIG. 4. Because the widths and depths of the groove sections (concave sections) 224a, 224b, 224c, and 224d of the first optical module holder section 212 are formed so as to slightly differ and the widths and heights of the protruding sections 234a, 234b, 234c, and 234d of the second optical module holder section 214 are formed so as to slightly differ, any protruding section (234a, 234b, 234c, and 234d) of the second optical module holder section 214 is appropriately selected and engaged with any groove sections (224a, 224b, 224c, and 224d) of the first optical module holder section 212, and is optimally disposed so that the optical coupling is most favorable. As a result, upon adjustment of the optical axis of the lens 222 of the first optical module holder section 212, the optical axis of the lens 232 of the second optical module holder section 214, and the misalignment of the respective photoelectric conversion elements (misalignments in the X direction and the Y direction), the optical transmitting and receiving module holder 210 can be fixed onto a board on which the photoelectric conversion elements are mounted, and the optical transmitting and receiving module can be produced, as with the optical transmitting and receiving module shown in FIG. 9. In particular, in the optical transmitting and receiving module holder 210 according to the present embodiment, both the groove sections (concave sections) 224a, 224b, 224c, and 224d of the first optical module holder section 212 and the protruding sections 234a, 234b, 234c, and 234d of the second optical module holder section 214 can be selected. Therefore, adjustments in the X direction and the Y direction can be easily and optimally performed, compared to the optical transmitting and receiving module holder 10 according to the first embodiment.

The optical transmitting and receiving module holder of the present invention is not limited to the embodiments described above. Various changes can be made as required. For example, in the above-described embodiments, the shape of the photoelectric conversion element in the first optical module holder section and the second optical module holder section is roughly rectangular or roughly octagonal-columnar. However, the shape can also be other polygonal columns.

In addition, instances are explained in which the optical transmitting and receiving module is produced by the above-described optical transmitting and receiving module holder according to the embodiments being fixed onto a board on which the photoelectric conversion elements are mounted. However, the optical transmitting and receiving module can be produced by a photoelectric conversion element package being respectively attached to the first optical module holder section and the second optical module holder section of the optical transmitting and receiving module holder according to the embodiments described above.

In the optical transmitting and receiving module holder according to the embodiments described above, the relative positions of the optical transmitting module holder section and the optical receiving module holder section can be quickly, easily, and accurately adjusted. Therefore, an optical transmitting and receiving module having excellent optical characteristics and that can appropriately perform optical coupling between the optical fiber and the photoelectric conversion element in each of the optical transmitting module holder section and the optical receiving module holder section can be manufactured at a low cost.

What is claimed is:

1. An optical transmitting and receiving module holder comprising:
    a first optical module holder section of which an optical transmission line attaching section for attaching an end section of a transmission line is formed on one end side and a photoelectric element housing section for housing a photoelectric element including one of either a light emitting element or a light receiving element is formed on the other end side; and a second optical module holder section of which an optical transmission line attaching section for attaching an end section of a transmission line is formed on one end side and a photoelectric element housing section for housing a photoelectric element including the other of either a light emitting element or a light receiving element is formed on the other end side;

wherein, at least one engaging section is provided on one of either the first optical module holder section or the second optical module holder section, a plurality of engaging-subject sections that can engage with the engaging section are provided on the other of either the first optical module holder section or the second optical module holder section, one engaging section engages with any of the plurality of engaging-subject sections, and relative positions of the first optical module holder section and the second optical module holder section are adjusted.

2. The optical transmitting and receiving module holder according to claim 1, wherein:

respective photoelectric housing sections of the first optical module holder section and the second optical module holder section have a polygonal columnar outer shape having a plurality of side surfaces extending in an axis line direction thereof;

the engaging section is formed on at least one side surface of the plurality of side surfaces of one of either the first optical module holder section or the second optical module holder section; and each of the plurality of engaging-subject sections are formed on each side surface of the plurality of side surfaces of the other of either the first optical module holder section or the second optical module holder section.

3. The optical transmitting and receiving module holder according to claim 1, wherein:

the engaging section is either a protruding section or a groove section;

each of the plurality of engaging-subject sections is the other of either the protruding section or the groove section; and the protruding section can be engaged with the groove section.

4. The optical transmitting and receiving module holder according to claim 3, wherein:

when each of the plurality of engaging-subject sections is the protruding section, a width and height of each protruding section respectively corresponds with a width and depth of the groove section that is the engaging section, and at least one of either the width or the height of each protruding section differs from at least one of either the width or the height of the other protruding sections; and when each of the plurality of engaging-subject sections is the groove section, a width and depth of each groove section respectively corresponds with the width and height of the protruding section that is the engaging section, and at least one of either the width or the depth of each groove section differs from at least one of either the width or the depth of the other groove sections.

5. The optical transmitting and receiving module holder according to claim 1, wherein:

a lens is integrally formed between the optical transmission line attaching section and the photoelectric element housing section of the first optical module holder section; and a lens is integrally formed between the optical transmission line attaching section and the photoelectric element housing section of the second optical module holder section.

6. The optical transmitting and receiving module holder according to claim 5, wherein:

axis lines of the first optical module holder section and the second optical module holder section are disposed in parallel with each other and in parallel with the optical axis of each lens;

one engaging section engages with any of the plurality of engaging-subject sections; and relative positions of the first optical module holder section and the second optical module holder section in a direction perpendicular to the axis line are adjusted.

7. An optical module comprising:

an optical transmitting and receiving module holder according to any one of claims 1 to 6; and a photoelectric element respectively mounted on the first optical module holder section and the second optical module holder section of the optical transmitting and receiving module holder.

* * * * *